INVENTOR.
ARMINDO CANTARUTTI

INVENTOR.
ARMINDO CANTARUTTI
BY
Oberlin, Maky & Donnelly
ATTORNEYS

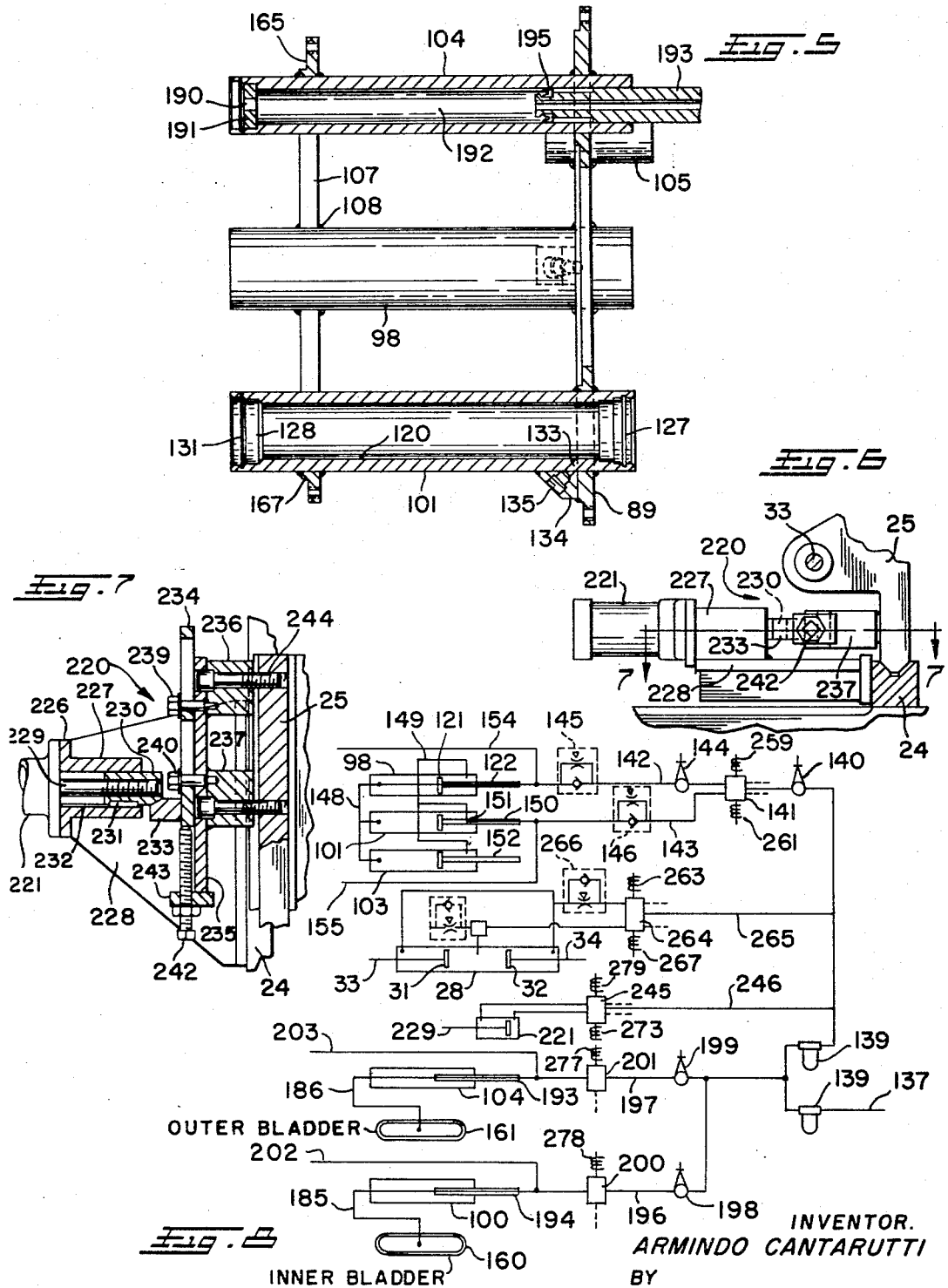

INVENTOR.
ARMINDO CANTARUTTI
BY
Oberlin, Maky & Donnelly
ATTORNEYS

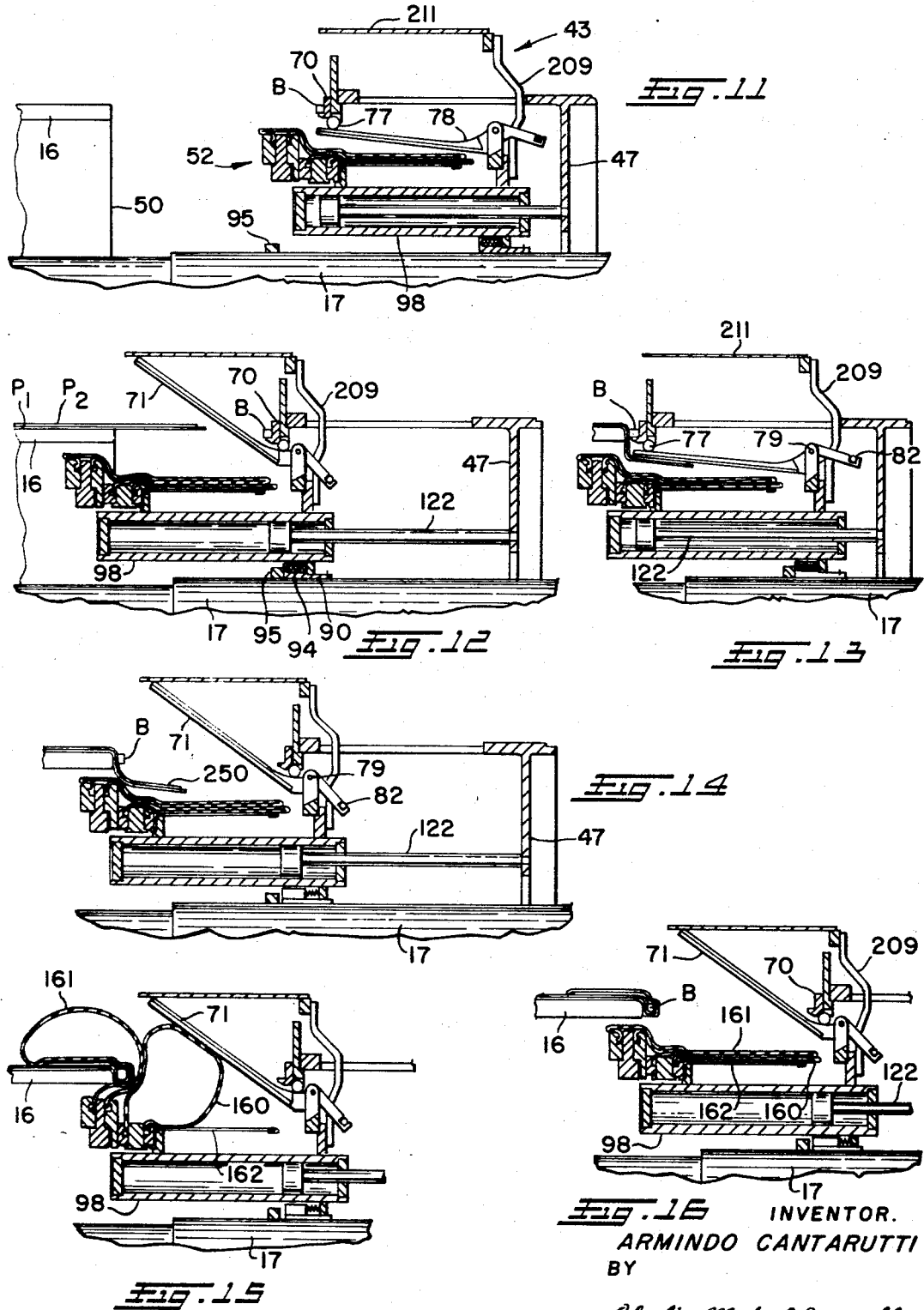

United States Patent Office 3,438,832
Patented Apr. 15, 1969

3,438,832
TIRE BUILDING MACHINE
Armindo Cantarutti, Cuyahoga Falls, Ohio, assignor to NRM Corporation, Akron, Ohio, a corporation of Ohio
Filed Aug. 17, 1964, Ser. No. 390,161
Int. Cl. B29h 17/22, 17/24
U.S. Cl. 156—401                                  11 Claims

ABSTRACT OF THE DISCLOSURE

A tire building machine with ply turn up means consisting of inflatable bags near the end of the tire building drum, one bag being contiguous to the other and arranged on inflation to push the first bag radially outwardly and to wrap around the end of the drum, and having fingers to turn down the ply edges and said fingers arranged to supply a reaction surface for said second bag during the wrapping around. The arrangement of the bags when deflated are such as not to interfere with the turning down of the ply edges over the bead.

---

This invention relates generally, as indicated, to a tire building machine and more particularly to certain improvements in tire building machines permittng the same to construct a greater variety of better quality green tires.

In conventional manner, green tires, sometimes referred to as tire carcasses, are built on machines of the type which utilize a radially collapsible rotary tire building drum around which the plies are wrapped and turned about beads at the ends of the drum. Chafer strips, breaker strips, tread stock, and like components are added and stitched to the plies and after completion of the carcass, the drum is collapsed and the carcass removed from the machine to be transported to a tire vulcanizer that is operative in well-known manner to deform the carcass to tire shape and to vulcanize the thus shaped carcass. Reference may be had to the patent to Ewing et al., No. 3,051,220 for an illustration of a tire building machine of the type employing a radially collapsible rotary tire building drum.

The various tire manufacturing companies may construct tires in a variety of ways and this is especially true with respect to two and four ply passenger tires. For example, in a two ply tire, some tire companies may specify that the first ply be turned up around the bead and the second ply tucked under, or that both plies be turned up around the bead. In a four ply tire construction, such tires may be built with the first two plies turned up and the last two turned under, or the first three turned up and the last one under, or all four plies turned up over the bead. Moreover, when the plies are turned up over the bead, it is desirable that they extend substantially inwardly along the ply on the drum and be pressed firmly thereagainst free of distortion and wrinkles. That this ply turn-up operation be accomplished quickly and in a manner which will produce a high quality tire carcass is highly to be desired.

It is accordingly a principal object of the present invention to provide a tire building machine incorporating a mechanism for turning the ply about the bead ring quickly in a manner free of distortion or wrinkles in the ply material.

Another object is the provision of a tire building machine having a ply turn-up mechanism which will completely circumferentially engage a tire ply and turn the same about the bead and press the same firmly back against the ply on the drum of the machine.

Yet another object is the provision of a tire building machine in which the plies may be turned up over the bead ring and pressed firmly in position free of distortions or wrinkling and then a second group of plies turned under the bead ring.

A further object is the provision of a tire building machine utilizing two expansible air bags brought into position at each end of the tire building drum and when inflated will uniformly wrap the ply or plies about the bead ring and firmly press the same against the drum quickly to produce a ply turn-up of uniform quality free of wrinkling and distortion.

A still further object is the provision of such a ply turn-up device for tire building machines which will more efficiently produce higher quality tire carcasses in a shorter period of time.

It is still another object to provide a bag turn-up mechanism for tire building machines which may be utilized with the conventional collapsible tire building drum presently in wide use throughout the tire industry.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawings:

FIG. 5 is a transverse section through such frame taken substantially on the line 5—5 of FIG. 4;

FIG. 6 is an enlarged side elevation of the cylinder operated intermediate stop mechanism for the axially movable bead setters;

FIG. 7 is a horizontal section taken substantially on the line 7—7 of FIG. 6;

FIG. 8 is a schematic piping diagram illustrating more clearly the electrical and pneumatic controls of the present invention;

FIGS. 11 through 16 are similar fragmentary schematic sections illustrating the various steps in the operation of turning the plies over the bead with the present invention.

Figure 1:
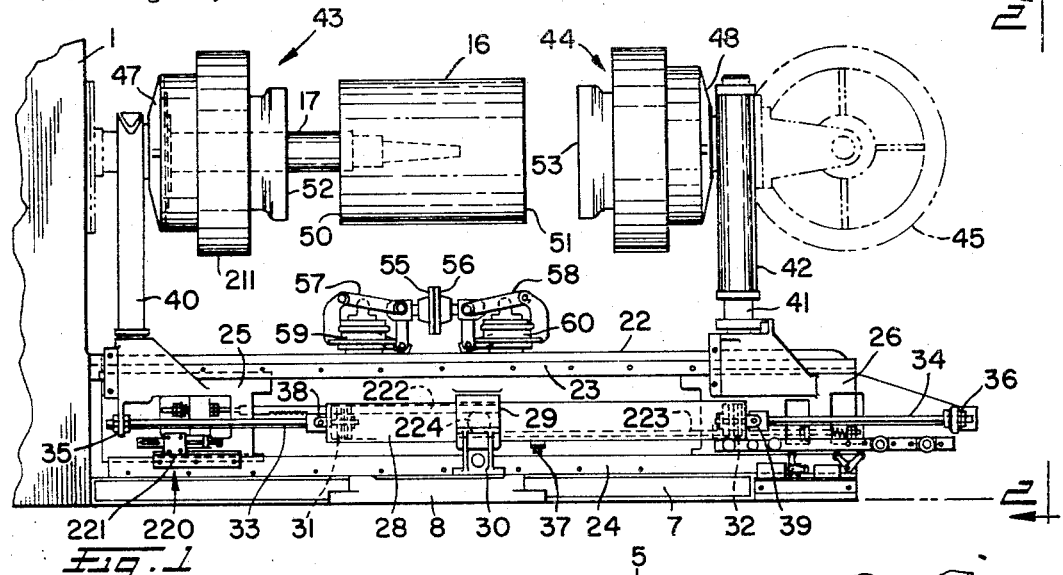
FIG. 1 is a fragmentary rear elevation of a tire building machine in accordance with the present invention.
Figure 2:
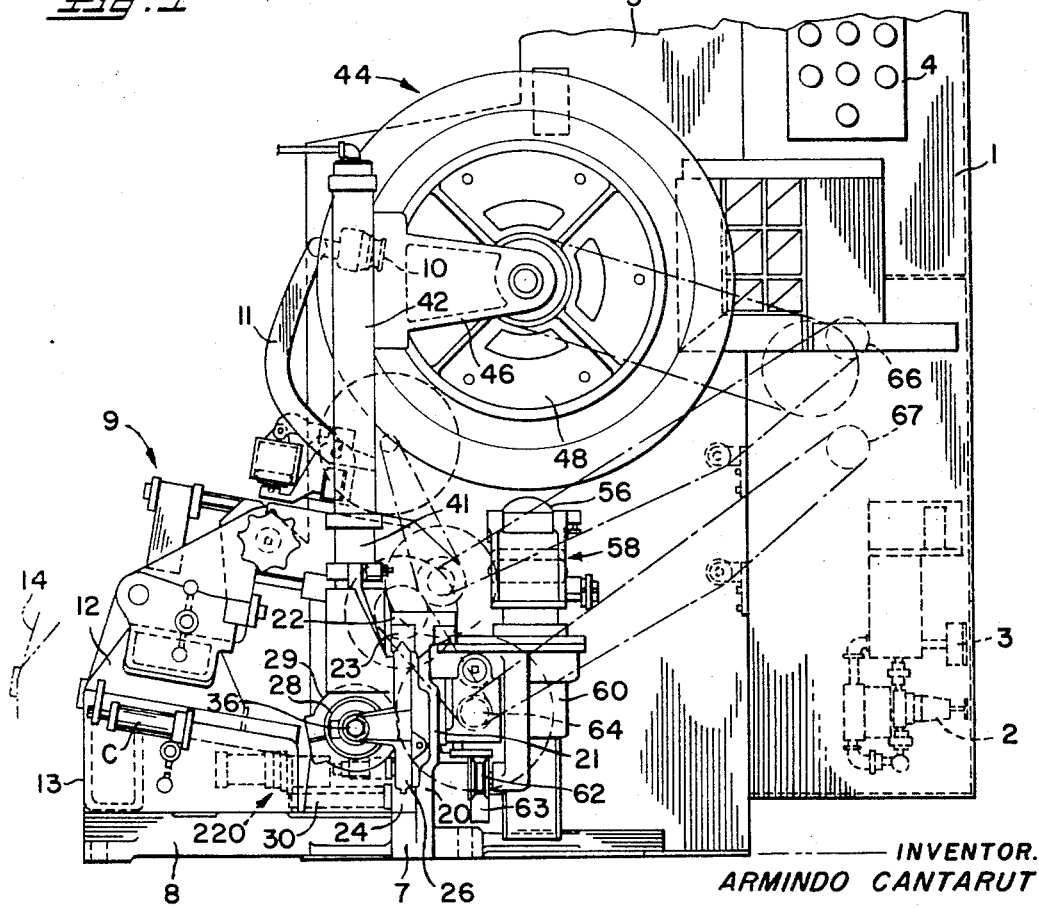
FIG. 2 is an enlarged fragmentary end elevation of the machine as seen from the right in FIG. 1 along the line 2—2 thereof.

Referring now to the annexed drawings and more particularly to FIGS. 1 and 2, there is illustrated a tire building machine in accordance with the present invention. It is noted that FIG. 1 is a rear elevation of the machine with certain components not shown for clarity of illustration. The machine comprises a main drive housing 1 which contains in the lower portion thereof the main drive motor as well as pneumatic circuit regulators indicated at 2 in FIG. 2 and pressure gauges 3. The lower portion of the housing may also contain special synchronizing drives which may be connected to servicers and like tire building material handling and storage equipment so that the materials may be applied to the machine at zero tension without wrinkling or distortion. The upper portion of the housing 1 contains electrical controls indicated at 4 and a timer may be enclosed in the portion of the housing 1 indicated at 5.

The machine includes a base 7 extending laterally from the housing 1 and is provided with a rearwardly extending portion 8 on which is mounted a bead stitching assembly shown generally at 9 which includes "acorn" tools 10 mounted on curved arms 11. The assembly 9 is mounted on a carriage 12 which is in turn mounted for movement by means of cylinder C on inclined support 13 as indicated by the phantom line position 14 in FIG. 2. In this manner, the tools 10 may be moved axially clear of the bead setting and ply turning mechanism hereinafter described. It will be understood that there are two tools 10 provided, one at each end of the drum, and that each tool may be manipulated by movement of the carriage 12, swinging or pivoting of the arm 11, as well as pivoting the tool 10 with respect to the arm 11. The drum 16 is of the conventional collapsible type for tire removal and is mounted on the drum shaft 17 extending from the housing 1. Such tools 10 are in the form of rollers and may be manipulated to tuck the plies of the green tire under or beneath the beads as the drum 16 rotates. Reference may be had to the patent to F. J. Shook et al., No. 2,488,340 for an illustration of such a ply turn-down device.

The frame 7 includes an upstanding web portion 20 which includes a laterally off-set portion 21 and which terminates in a top shelf 22. Mounted on such upstanding portion to the rear thereof are top and bottom rails 23 and 24, respectively, which include opposed V-shape rail surfaces which engage and guide similar surfaces on carriages 25 and 26 confined therebetween. The carriages 25 and 26 are thus mounted for movement along the rails 23 and 24 in a direction parallel to the axis of the drum 16.

Movement of the carriages is obtained by pneumatic cylinder 28 which is held by clamp 29 mounted on bracket 30 in turn supported on the rearward extension 8 of the base. The cylinder 28 is provided with two pistons 31 and 32 connected to rods 33 and 34, respectively, projecting from opposite ends of the cylinder. The rods are connected at 35 and 36 to the carriages 25 and 26, respectively. The cylinder 28 includes a centrally disposed coupling or union 37 to which a pneumatic line may be connected to pressurize the cylinder causing the pistons 31 and 32 to move apart to the maximum extent as indicated in FIG. 1. Connections 38 and 39 are provided at the opposite ends of the cylinder for connection of pneumatic lines so that when pressurized and the port 37 vented, the pistons can be caused to move together to move the carriages toward each other.

Mounted on the carriages 25 and 26, respectively, are posts 40 and 41, the latter post having mounted thereon cylindrical collar 42 supported for axial rotative movement. The post 40 and the rotative post 42 support inboard and outboard assemblies 43 and 44, respectively, for movement with the carriages 25 and 26 coaxially of the drum 16, with the latter assembly 44 also being mounted for swinging movement through an arc of 90° toward the front of the machine as indicated by the phantom line position 45. The assemblies 43 and 44 are mounted on the carriage posts by means of arms shown at 46 in FIG. 2 which are secured to annular frames 47 and 48 with the supporting arm and frame 47 of the inboard assembly 43 surrounding the drum shaft 17.

The assemblies 43 and 44 contain mechanisms for turning the overhanging ply edges wrapped about the drum 16 down over the edges of the drum shown at 50 and 51, bead setting mechanisms for placing the tire beads against the turned down plies, and dual bladder ply turn-up mechanisms for wrapping the plies about the thus positioned beads indicated generally at 52 and 53 for the inboard and outboard assemblies, respectively. The present invention pertains more particularly to the assemblies 43 and 44 and such will be described hereinafter in greater detail.

Still referring to FIGS. 1 and 2, at the front of the machine there is provided a pair of tread stitcher discs 55 and 56 which are mounted on parallelogram linkages 57 and 58, respectively, and moved toward and away from the surface of the drum 16 by cylinder assemblies 59 and 60. The respective cylinders are mounted on carriages 61 as seen in FIG. 2 which are supported by rollers 62 on rails 63 extending parallel to the axis of the drum. A feed screw 64 extends through the carriages and rotation of the feed screw in the opposite direction will cause the tread stitcher discs to move axially apart or toward each other. In this manner the tread stock may firmly be stitched in place on the drum 16 by bringing the discs to bear against the stock and moving the same axially of the drum. Both the bead stitching assemblies 9 as well as the tread stitching discs 55 and 56 may be driven in a completely automatic manner and for this purpose a cam stack may be provided at 66 for the assemblies 9 and at 67 for the tread stitchers as seen in FIG. 2.

Figure 3:
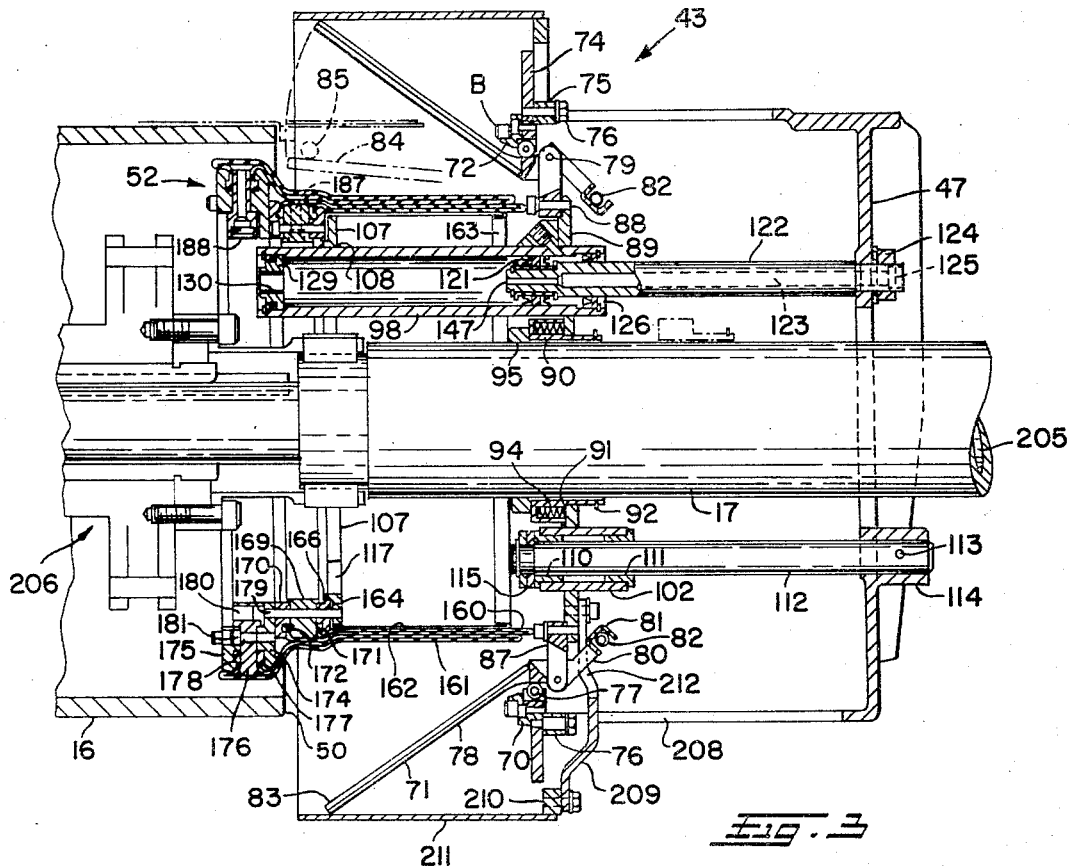
FIG. 3 is a diametrical section illustrating one of the ply down and bladder type turn-up assemblies at each end of the tire building drum.
Figure 4:
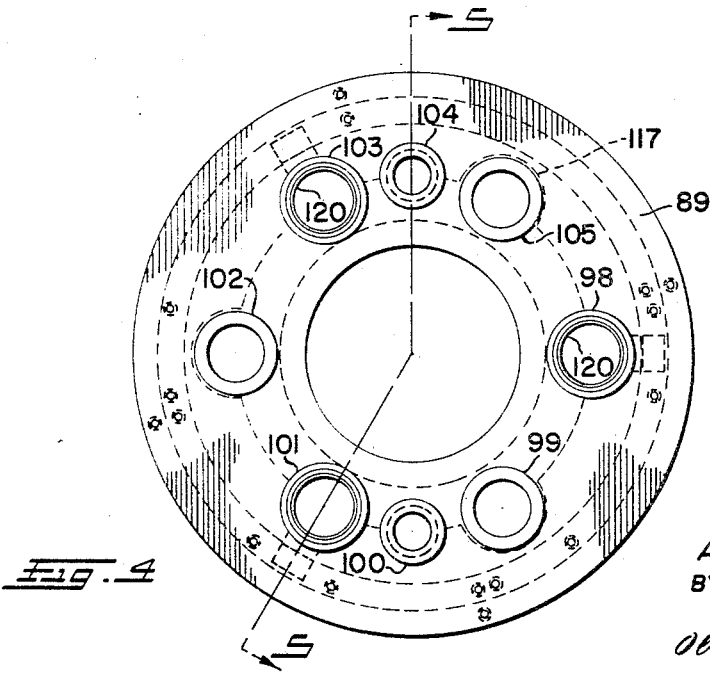
FIG. 4 is an enlarged end elevation of the inner supporting frame of the axially movable finger ply down and bag turn-up mechanism.

Referring now more particularly to FIGS. 3, 4 and 5, and first to FIG. 3, there is illustrated a diametrical horizontal section of the inboard assembly 43 as seen from the front of the machine which illustrates in section the bead setting ring 70, the ply down fingers 71, and the dual bladder ply turn-up assembly 52. The bead setting ring 70 is provided with an annular lip 72 underlying the bead B providing a shoulder on which the bead may be placed by the operator. The ring 70 is secured by suitable fasteners 73 to annular plate 74 in turn secured by fasteners 75 to blocks 76 mounted on the cylindrical housing extending axially from the periphery of the frame 47. The inner periphery of the plate 74 is provided with a series of rollers 77 each of which cooperate with cam tracks 78 provided on each of the ply down fingers 71 to cause the same to swing about their pivots 79 as the ring 76 and thus the rollers 77 are moved axially of the drum 16 with respect to the fingers 71.

Each of the ply down fingers is provided with a rearward extension 80 which terminates in a channel shape retainer 81 receiving an annular garter spring 82 which urges the ply down fingers toward their outwardly extending position shown in full lines in FIG. 3, thus maintaining the cam tracks 78 in engagement with the rollers 77. As the rollers are moved axially with respect to the ply down fingers, the outer ends 83 thereof will pivot radially inwardly toward the phantom line position indicated at 84 while the rear arm extensions 80 will pivot radially outwardly extending the garter spring 82. To pivot the fingers in this manner, the rollers 77 will move to the phantom line position shown at 85.

The ply down fingers are pivotally mounted at 79 in suitable yokes on annular ring 87 which is secured by fasteners 88 to annular frame ring 89. The ring 89 is illustrated in end elevation in FIG. 4 and is supported on shaft 17 for movement with respect to the frame 47 and, of course, to the bead ring 70. The ring 89 is mounted on a ring 90 surrounding the shaft 17 with clearance and is axially movable on the ring 90 between shoulder 91 and stop ring 92. A series of compression springs 94 mounted in the axially inner end of the ring 90 urge the ring 89 toward the stop ring 92. A stop ring 95 surrounds the shaft 17 and limits the axial inward movement of the frame ring 89.

Referring now additionally to FIGS. 4 and 5, it will be seen that the frame ring 89 forms an annular support for the axial outer end of the assembly supporting the ply down fingers 71 and the dual bag turn-up mechanism 52 for movement axially with respect to the frame 47 supporting the bead setting ring 70. As seen more clearly in FIG. 4, the ring 89 contains eight apertures in which are secured as by welding tubular members 98, 99, 100, 101, 102, 103, 104 and 105. The centers of such tubular members are all equally spaced radially from the center of the ring 89. The tubular members 98, 101 and 103 are identical in form and project at the axial outer end of the assembly slightly through the annular frame ring 89 and at the opposite or axial inner end through semi-circular apertures in the inner periphery of inner frame ring 107, being secured in such semi-circular apertures as by the welding indicated at 108. The two tubular members 100 and 104 are coextensive with the members 98, 101 and 103 but are of somewhat smaller diameter and are also secured to the ring 107 as by welding in semi-circular recesses in the inner periphery thereof. The ring 89 is accordingly structurally joined to the ring 107 by means of the tubular members 98, 100, 101, 103 and 104 extending axially therebetween. The tubular members 99, 102 and 105 are of considerably shorter length as seen in FIGS. 3 and 5 with special reference to FIG. 3, may contain bushings 110 and 111 in each end thereof accommodating guide rods 112 for sliding movement therethrough. Such guide rods may be pin connected at 113 to hubs 114 in the frame 47 and the opposite or inner ends may be provided with stop washers 115 secured as illustrated between a snap ring and shoulder on the end of the rods. The inner periphery of the ring 107 may be cut-away as indicated at 117 to form semi-circular recesses in the inner periphery thereof to accommodate movement of the stop washers 115 therepast.

The cylinders 98, 101 and 103 are each provided with cylinder bores 120 accommodating pistons 121 therein for axial movement. The piston 121 in cylinder 98 is mounted on the end of hollow rod 122 having air passages therethrough. The end of the rod 122 opposite the piston 121 is secured to the wall of the frame 47 by nut 124. The bore 123 at the end of the rod 122 is threaded as indicated at 125 so that a pneumatic line may be connected thereto. The rod 122 extends through a ring and seal assembly 126 mounted in the rod end of the cylinder which may be held in place by a snap ring in groove 127. The opposite or blind end of each of the cylinders is provided with a counterbore 128 in which is secured ring 129 having an exterior groove provided with an O-ring effecting a pneumatic seal and provided with a threaded aperture 130 centrally therethrough. An air line, not shown in FIG. 3, but illustrated schematically in FIG. 8, is connected thereto. The ring 129 may be held in place by a snap ring in groove 131. It will thus be seen that the cylinders 98, 101 and 103 and the associated pistons and rods obtain relative movement between the frame 47 and the assembly illustrated in FIG. 5 which supports the ply-down fingers 71 and the dual bag turn-up assembly 52.

Each of the cylinders is provided with a rod end port as indicated at 133 in FIG. 5 which communicates with block 134 welded to the respective cylinder and the annular ring 89. The block 134 is provided with a threaded aperture communicating with the rod end port 33 as shown at 135 to which air lines are connected again as more clearly illustrated schematically in FIG. 8.

Referring now to such FIG. 8 and to the pneumatic piping connected to the cylinders 98, 101 and 103, it will be seen that all of such cylinders are connected in parallel and air may be supplied from source 137 through lubricator 138 and filter 139, through gauge 140 to solenoid valve 141 directing air flow to line 142 or 143. The line 142 may contain a gauge 144 and both lines are provided with flow regulators as indicated at 145 and 146, respectively. The line 142 is connected at 125 to the rod 122 which is provided with passage 147 through the piston 121 communicating with the cylinder 98. Pressure thus placed in the cylinder 98 on the blind side of the piston 121 will cause the cylinder to move to the left as seen in FIGS. 3 and 8. The blind end of the cylinder is connected through the port 130 to line 148 which is connected to the blind end of each of the cylinders thus pressurizing the same to cause the cylinders to move simultaneously to the left as thus viewed. The rod ends of the cylinders are vented through the ports 133 which are each connected to line 149. The hollow rod 150 for the cylinder 101, instead of having a passage passing axially through the piston thereon, is provided with a transverse passage schematically indicated at 151 so that the rod end of each of the cylinders will be vented through the line 149, the transverse passage 151 in the rod 150 and through the line 143. The rod 152 of the cylinder 103 may be a solid rod.

When the solenoid valve 141 is reversed, air will be supplied through the line 143, through the hollow rod 150, and through transverse passage 151 into the rod end of cylinder 101. Since the rod end of the cylinder 101 is connected through the line 149 to the rod end of each of the cylinders, the cylinders will be caused to move to the right as seen in FIG. 3 and FIG. 8 with respect to the rods. The blind end of the cylinders will be vented through the line 148, and the hollow rod 122 back to the line 142. Air lines 154 and 155 connected to the lines 142 and 143, respectively, may be connected to the assembly 44 at the opposite end of the drum which is identical in form to that illustrated in FIG. 3.

The dual bladder assembly 52 is secured to the inner ring 107 attached to and spaced from the ring 89 by means of the cylinders 98, 100, 101, 103 and 104 extending therebetween. With special reference to FIG. 3, it will be seen that the assembly 52 comprises an inner annular bladder 160 and an outer annular bladder 161 which are illustrated in FIG. 3 in their deflated or flat folded conditions. In such condition, the bladders will lie adjacent each other as shown and radially on top of a sheet metal annular support 162 which includes a flat folded edge 163 and a radially inturned flange 164 at the axial inner end which is secured between the surface 165 of the ring 107 and inner bladder retaining ring 166. Both the ring 166 and the flange 164 are seated on the shoulder 167 of the ring 107. (See FIG. 5.)

Adjacent the ring 166 is a spacer ring 169 which spaces the bead retaining ring 166 from the bead retaining ring 170 on opposite sides thereof. The rings 170 and 166 are provided with annular recesses adjacent the spacing ring 169 to clamp, seal, and retain the annular beads 171 and 172, respectively, of the inner bladder 160.

The outer bladder 161 is also provided with bead clamping rings 174 and 175 with a spacer ring 176 interposed therebetween. The rings 174 and 175 clamp, seal and retain the annular beads 177 and 178 of the outer bladder 161. It is noted that the rings 174, 175 and 176 are of a slightly larger diameter than the rings 166, 169 and 170 so that a step is provided between the retaining rings for the inner bladder and those for the outer bladder. This step ensures that the outer bladder will lie over the top of the inner bladder in the deflated position and also spaces the outer bladder the proper distance from the interior of the drum 16. The spacing of the outer bladder from the drum radially inwardly as well as axially from the end of the drum 50 is fairly critical to the proper operation of the bladder turn-up mechanism.

Elongated studs 179 extend through apertures 180 in the spacing ring 176 and extend through the clamping rings 174 and 170, the spacing ring 169, and the clamping ring 166 to be secured to the ring 107. Fasteners 181 may be employed to clamp the rings 175 and 176 to the ring 174.

Referring now to FIGS. 3, 4, 5 and more particularly to FIG. 8, the inflation of the inner and outer bladders 160 and 161 is accomplished by means of air lines 185 and 186, respectively, which are connected to the threaded ports shown at 187 and 188 in FIG. 3 extending radially through the spacer rings 169 and 176, respectively. The opposite end of the air lines 185 and 186 is connected to the threaded aperture 190 in rings 191 held by suitable snap rings in the ends of each of the elongated cylinders 100 and 104 extending between the annular rings 89 and 107. The cylinders 100 and 104 have bores 192 therein in which slide hollow rods 193 and 194, respectively, and sliding seals 195 are provided between the rod and cylinder bore. The rods 193 and 194 are connected to the frame 47 in the same manner that the rods 122 are connected as seen in FIG. 3.

As seen in FIG. 8, air from source 137 passes through the lubricator 138 and into lines 196 and 197 through gauges 198 and 199, respectively. The air then passes through single solenoid control valves 200 and 201 and into the rods 193 and 194 which provide communication with the bladders through the cylinders and lines 185 and 186. The bladders may then be inflated or deflated at the direction of the valves 200 and 201 regardless of the axial position of the rods 193 and 194 with respect to the cylinders 104 and 100, respectively. Lines 202 and 203 are connected to the bladder assembly 53 at the opposite end of the drum.

Before leaving FIG. 3, it is noted that the drum shaft 17 is provided with an inner shaft 205 which operates the mechanism illustrated schematically at 206 which collapses or expands the drum 16. In the expanded condition, the cylindrical surface thereof forms the working surface for the construction of the tire carcass, and when collapsed, the finished tire carcass can be removed therefrom. Also, it is noted that the cylindrical housing extending from the frame 47 is provided with a plurality of windows 208 through which project radially extending fingers 209 which are offset as indicated at the bottom of FIG. 3 to clear the blocks 76. Such fingers extend from the ring 89 outwardly to a ring 210 which has a cylindrical housing 211 extending axially therefrom. The housing 211 encloses the ply-down fingers 71. Suitable fasteners may be provided securing the radially extending fingers 209 both to the ring 89 and the ring 210 and such fingers may be provided with slots 212 through which the rearwardly projecting arms 80 of the ply-down fingers extend.

OPERATION

Referring now to schematic FIGS. 11 through 16 as well as FIG. 1, the inboard and outboard assemblies 43 and 44 are moved axially apart by the action of the cylinder 28 with the outboard unit swinging to the position indicated in phantom lines at 45. The drum 16 is then collapsed and the tire build thereon is then axially removed therefrom. While the drum is thus collapsed, the operator will then place the beads B on the ring 70 in the respective assemblies with the bead for the inboard assembly being moved axially over the collapsed drum 16. The outboard unit is then swung to the full line position shown in FIG. 1 and the drum 16 is expanded so that construction of another tire carcass can then begin. The inboard and outboard assemblies are then in the relative position with respect to the drum shown in FIGS. 1 and 11. The operator may then place the various materials of the tire on the tire building drum and such materials may include two tire plies P1 and P2 which overhang or extend axially of the end of the drum 50 a substantial distance.

In the FIG. 11 position, the frame 47 is retracted and the bladder assembly 52 is also retracted with respect to the frame 47 with the rollers 77 engaging the ply-down fingers 71 to hold the same in the retracted position. In this position, the bead ring 70 is cleared for the placement by the operator of the bead B thereon. Now moving to FIG. 12, after the two plies P1 and P2 and been placed on the drum 16, the dual bladder assembly 52 which includes the ply-down fingers 71 is then moved axially toward the drum with respect to the frame 47 by supplying air under pressure to the blind ends of the cylinders 98, 101 and 103. In such position, the two bladders 160 and 161 move to the position with the outermost bladder just slightly inside the end of the drum 50. Air is continually supplied to the cylinders to maintain the ring 90 against the stop 95 compressing the springs 94. The stop 95 on the shaft 17 thus locates the bladder assembly with respect to the drum 16. Shortly after the bladder assembly is moved in, to achieve the position shown in FIG. 12, the bead setting assembly which comprises the ring 70 mounted on the frame 47 is then moved axially toward the drum by the action of the piston-cylinder assembly 28 seen in FIGS. 1 and 8 and such movement compresses the air within the cylinders 98, 101 and 103 maintaining the dual bladder assembly against the stop ring 95.

As the ring 70 moves axially toward the end of the drum, the rollers 77 ride along the rails 78 on the ply-down fingers 71 causing the same to swing about their pivots 79 against the pressure of the garter spring 82 to swing radially inwardly to the position indicated in FIG. 13. This movement of the ply-down fingers causes the plies P1 and P2 to be folded evenly over the end 50 of the drum 16 and as soon as thus folded, the bead B is set in place against the end of the drum with the plies interposed between the bead and the drum end. Since the bead has a tacky substance surrounding the same and the plies P1 and P2 are also of a tacky nature, the bead B will adhere itself to the thus turned-down plies.

The frame 47 is now retracted against an intermediate stop to the position shown in FIG. 14. The compressed air within the cylinders 98, 101 and 103 will maintain the dual bladder assembly in the position shown in FIG. 14 even as the frame 47 is retracted. The springs 94 will, however, move the ring 90 slightly from the stop 95 to permit the fingers 71 substantially to clear the bead now placed against the turned-down plies on the end of the drum.

The intermediate stop is shown at 220 in FIGS. 1 and 2 and in detail in FIGS. 6 and 7. Referring now momentarily to such figures and first to FIG. 1, it will be seen that the stop 220 is operated by a cylinder 221 which is mounted on the rail 24 adjacent the path of the carriage 25. Since the carriages 25 and 26 are synchronized for movement by the racks 222 and 223 connected thereto, respectively, and both in mesh with pinion 224, it will be seen that only one stop 220 need be provided. Referring now more particularly to FIGS. 6 and 7, it will be seen that the cylinder 221 is mounted on the annular flange 226 of housing 227 which is secured as by welding to the apex of triangular support plate 228 which is in turn secured by suitable fasteners to the rail 24. The rod 229 of the cylinder assembly 221 projects through the housing 227 and is threadedly secured to stop member 230. A guide key 231 and keyway 232 are provided to keep the stop member from rotating on the rod.

As can be seen more clearly in FIGS. 7, the stop member 230 is provided with a beveled stop surface which engages a mating beveled surface on stop member 233 mounted on plate 234. The plate 234 is adjustably mounted on plate 235 bridging blocks 236 and 237 and is adjustably secured to such plate 235 by clamping screws 239 and 240 projecting through horizontally elongated slots in the plate 234. An adjusting screw 242 is threaded in end flange 243 on the plate 235 and it can be seen that the plate 234 and thus the stop 233 can be adjusted by the screw 242 when the clamping screws 239 and 240 are loosened. Elongated fasteners 244 extending through the blocks 236 and 237 secure the plate 235 and the adjustable plate 234 to the carriage 25.

As seen in FIG. 8, the stop cylinder 221 is controlled by a double solenoid valve 245 and air is supplied to the valve from the branch line 246 to either end of the cylinder 221 at the direction of the valve 245.

Resuming now the discussion of the operation of the machine, and referring again to FIGS. 11 through 16 and particularly to FIG. 14, the frame 47 is now retracted against the stop 230 and this serves to maintain the dual bladder assembly 52 and the ply-down fingers 71 in the relative position with respect to the end of the drum shown in such FIG. 14. Moving now to FIG. 15, with the plies down and the bead B set, the bladders 160 and 161 are now inflated, preferably substantially simultaneously, to cause the ends of the plies indicated at 250 to be wrapped about the bead and back over the top of the plies on the drum and pressed firmly thereagainst. It is, of course, the outer bladder 161 which engages the ply ends 250 to cause the same to be wrapped about the bead and pressed against the plies on the drum and the inner bladder 160 serves to exert a force on the outer bladder causing the same to roll along the top of the drum as indicated in FIG. 15 thus quickly and uniformly to press the plies back against the plies on the end of the drum in a manner free of wrinkles or distortion. The inner bladder 160 reacts against both the bladder support 162 and the inclined ply-down fingers 71 to force the outer bladder over the top of the drum end. The ply-down fingers form with the bladder support 162 an annular V-shape retaining ring for the inner bladder 160 forcing the outer bladder radially outwardly and axially to the position shown to perfom its ply turn-up function. When the ply turn-up operation has been completed, the inner bladder is first deflated to permit the outer bladder to roll back and then the outer bladder is deflated to assume the position of FIG. 16 as will hereinafter more fully be described in conjunction with the timed cycle of operation. The operator may add additional plies turning the same beneath the bead with the "acorn" tools 10 shown in FIG. 2. The positioning of the bladder support rings in a radially inwardly spaced position with respect to the end of the drum permits the tool 10 to be utilized to tuck the next plies under. However, it will be appreciated that certain tire manufacturers may not desire the additional tucked under plies, but the mechanism illustrated for the ply turn-up readily permits such subsequent ply tuck under operation. With the stop 230 removed, the piston-cylinder assembly 28 is then employed to retract the bead setting frames 47 to the end of their stroke and the piston-cylinder assemblies 98, 101 and 103 may be supplied with air under pressure at the rod ends thereof to move the components to the position shown in FIG. 11. After the optional addition of turned under plies, tire tread stock, and other materials are applied, the drum is then collapsed and the finished tire carcass is removed therefrom. The operator then places the beads for the next cycle of operation.

TIME CONTROLLED CYCLE

Figure 9:
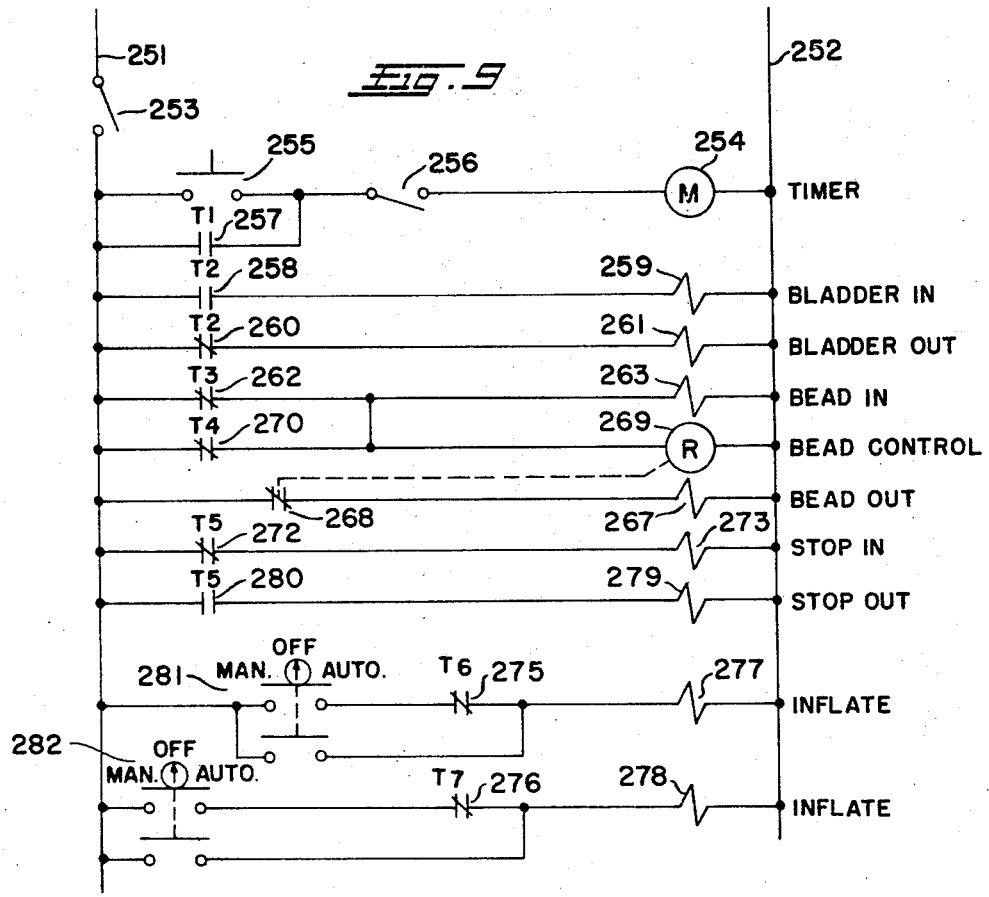
FIG. 9 is a schematic wiring diagram illustrating the electrical controls of the present invention.
Figure 10:
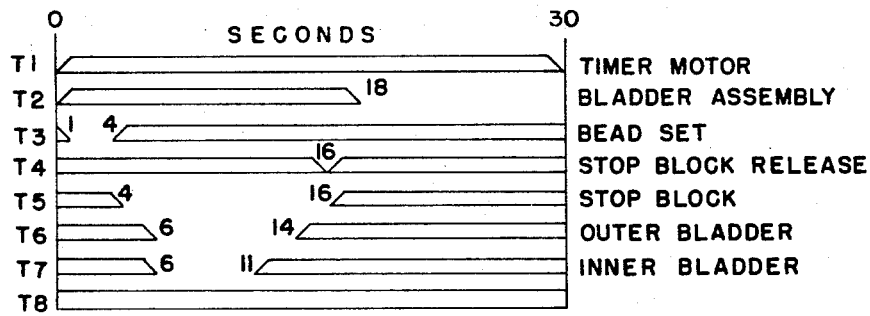
FIG. 10 is a schematic timer diagram illustrating the sequence of operation of the various components of the present invention.

Referring now to FIGS. 9 and 10 and also to FIG. 8, it will be seen that the ply turn-up operation above-described can be accomplished completely automatically by the timer controlled circuit illustrated schematically in FIGS. 9 and 10. Referring first to such FIG. 9, there is illustrated the schematic circuit which comprises circuit means 251 and 252 providing 115 volt, 60 cycle current. An on-off switch 253 is provided in the main 251 to energize the entire illustrated circuit when closed. The first component in the circuit is a timer motor 254 which may be energized by a cycle start push button 255 through a normal-hold switch 256. The push button switch 255 may be located in the control panel 4 illustrated in FIG. 2, if desired. The timer employed may be of conventional variety such as the type including a motor driven cam stack with each of the cams operating a plurality of switches in a pre-set sequence. It will, of course, be understood that other types of timing devices may be employed.

The timer motor 254 when energized immediately closes switches 257 and 258, the former providing a holding circuit around the push button 255 and the latter energizing solenoid 259. The timer motor 254 also immediately opens switch 260 maintaining the solenoid 261 deenergized. The solenoids 259 and 261 operate the valve 141 illustrated in FIG. 8 to move the bladder assembly in or out, respectively. With the switch 258 closed and the switch 260 opened, the solenoid 259 will be energized to move the bladder assembly in to the FIG. 12 position.

As seen by the timer chart in FIG. 10, the switch 262 is opened approximately one second after the energization of the timer motor 254 to deenergize solenoid 263. The solenoid 263 operates valve 264 to supply air from branch 265 through flow control unit 266 seen in FIG. 8 to the opposite ends of the cylinder 28 to cause the bead setting rings to move axially toward the drum to the position shown in FIG. 13. The other solenoid 267 operating the valve 264 is operated by relay control switch 268 operated by relay 269 controlled by timer switch 270. With the solenoid 263 energized, the bead setting mechanism will move inwardly. The solenoid 263 is deenergized after the bead has been set and the compressed air within the cylinders 98, 101 and 103 will then move the bead setting assembly back against the stop 230 which has been engaged by the switch 272 operating solenoid 273. At this time, the springs 94 prevail on the air within the cylinders 98, 101 and 103 moving the ply-down fingers 71 back approximately ½ inch to clear the bead B so that the fingers will not open until clear of the bead. With the frame supported by the carriage against the stop 230, the parts will now be in a position such as that shown in FIG. 14.

Now, through switches 275 and 276 solenoids 277 and 278 will be energized controlling valves 201 and 200, respectively, to inflate the inner and outer bladders simultaneously. Inflation of the bladders thus positioned with respect to the end of the drum 16 causes the bladders to assume the position shown in FIG. 15 with the bladder 160 reacting against the support 162 and the ply-down fingers 71 to force the outer bladder to roll over the end of the drum firmly turning the ply up and pressing it back against the plies on the drum free of wrinkles or distortions. The timer continues to operate and deenergizes solenoid 278 approximately three seconds before the de-energization of the solenoid 277 so that the inner bladder will begin to deflate first and in this manner the bladders more quickly return to their original deflated flat folded positions on the support 162 without distortion or undue abrasive action on the bladders or parts thereadjacent. Shortly after the outer bladder has been deflated, solenoid 279 will be energized by switch 280 to withdraw the stop 230 and at the same time the valve 264 may be pulsed through the switch 270 to remove the frictional pressure on the engaging stop surfaces shown in FIG. 7 and with the stop thus removed, the bead setting assemblies will be withdrawn to their outermost positions.

As illustrated in FIG. 9, manual or automatic controls may be provided at 281 and 282 for the inflation of the respective bladders of each assembly. When the bladders are deflated, the operator may place additional plies on the drum tucking the same under the bead since adequate clearance is provided between the bladders and the drum. The timer motor will continue the cycle and shut itself off by opening the switch 257. The sequence of the function of the components can be seen perhaps more clearly in the cycle time chart shown in FIG. 10.

Instead of using the fixed reaction members 71 and 162 to control the forces exerted by the bladder 160, special reinforcing ring sections may be provided in such bladder to force the bladder 161 radially outwardly and to roll or wrap over the end of the drum.

It will be appreciated that the operator may turn a single ply, two, three, four, or even more plies over the bead in the manner illustrated or he may turn the desired number over and then place the additional plies on the drum to be tucked under by the "acorn" tools. In any event, the tire may be made in any manner desired, but the present invention permits the plies to be turned up over the bead quickly and in a uniform manner free of distortion while still permitting subsequent plies to be turned under the bead.

Other modes of applying the principle of the invention may be employed, change being made as regards the details described, provided the features stated in any of the following claims or the equivalent of such be employed.

I, therefore, particularly point out and distinctly claim as my invention:

1. A ply turn-up mechanism for a drum type tire building machine comprising a first inflatable bag secured to a ring positioned inside and near the end of such drum, said first bag when deflated extending in a substantially flat condition axially beyond such drum, means operative to inflate said first bag, a second inflatable bag secured to a ring positioned slightly radially inwardly and axially beyond but adjacent to the ring of said first bag at the end of such drum, said second bag when deflated extending in a substantially flat condition axially beyond such drum and underlying said first bag when deflated, means operative to inflate said second bag whereby said second bag will be operative to push said first bag radially outwardly to cause the same to wrap around the end of such drum, and fixed reaction means operative to engage said second bag when inflated to cause the same to force said first bag to wrap around the end of such drum, said reaction means comprising a frusto-conical surface with the base thereof positioned toward such drum and coaxial therewith, said frusto-conical surface being formed by a plurality of pivotally mounted ply-down fingers operative to turn the plies over the end of such drum when pivotally moved.

2. A tire building machine comprising a cylindrical drum adapted to receive a tire ply with the edges thereof extending substantially beyond the ends of the drum, means to turn the ply edges down over the ends of the drum, bead setting means operative to place tire beads against the ends of the drum with the turned down ply between the beads and drum ends, annular bladder ply turn-up means positioned radially inwardly of each drum end and extending axially beyond the drum, means operative to inflate said annular bladder ply turn-up means to cause the same completely circumferentially to engage such turned down ply ends and turn the same upwardly over such beads and to press them firmly back against the ply on said drum, said means to turn the ply edges down over the ends of the drum comprising a plurality of pivotally mounted ply turn-down fingers, said fingers when retracted forming a frusto-conical reaction surface for said annular bladder ply turn-up means to cause the same to wrap around the ends of such drum when inflated.

3. A tire building machine comprising a cylindrical drum adapted to receive a tire ply with the edges thereof extending substantially beyond the end of the drum, means to turn the ply edges down over the ends of the drum, bead setting means operative to place tire beads against the ends of the drum with the turned down ply between the beads and drum ends, ploy turn-up means positioned radially inwardly of each drum end and extending axially beyond the drum, each said turn-up means including an outer annular bladder and an inner annular bladder, said bladders when deflated extending axially beyond the drum, an annular housing for said bladders including a frusto-conical outer wall, said inner bladder when inflated reacting against said frusto-conical outer wall to force said outer bladder when inflated to wrap around the respective end of the drum, said frusto-conical outer wall of said housing comprising pivotally mounted ply turn-down fingers which turn the ply edges down over the ends of the drum.

4. A ply turn-up mechanism for a drum type tire building machine comprising a first inflatable bag secured to a ring positioned inside and near the end of such drum, said first bag when deflated extending in a substantially flat condition axially beyond such drum, means operative to inflate said first bag, a second inflatable bag contiguous with said first bag secured to a ring positioned slightly radially inwardly and axially beyond but adjacent to the ring of said first bag at the end of such drum, said second bag when deflated extending in a substantially flat condition axially beyond such drum and underlying said first bag when deflated, and means operative to inflate said second bag whereby said second bag will be operative to push said first bag radially outwardly to cause the same to wrap around the end of such drum, and ply down fingers which when retracted form a frusto-conical reaction surface for said second bag, said ply down fingers being movable axially of such drum, and gage stop means operative to position said fingers properly with respect to the drum end.

5. A tire building machine comprising a cylindrical drum to receive a tire ply with the edges thereof extending substantially beyond the ends of the drum, means for turning the ply edges down over one end of the drum with a tire bead thereagainst, a first inflatable bag secured to a first ring, means for supporting said first ring adjacent such one end of said drum, said first bag when deflated extending in a substantially flat condition axially away from said drum and being sufficiently radially inwardly spaced from such one end of said drum so as not to interfere with the turning down of the ply edges over such one end with the bead thereagainst, means for inflating said first bag, a second bag secured to a second ring, means for supporting said second ring adjacent such one end of said drum with said second bag, when deflated, being radially inwardly of and contiguous with said first bag when deflated, and means for inflating said second bag and causing said second bag to push said first bag when inflated radially outwardly and cause the same to wrap around such one end of said drum for turning the ply edges up around the bead and against the tire ply on the drum.

6. A tire building machine as set forth in claim 5 wherein said means for causing said second bag to push said first bag radially outwardly as aforesaid comprises a cylindrical bag support extending axially of said drum radially inwardly of said second bag.

7. A tire building machine as set forth in claim 5 wherein said first and second bags when deflated are sufficiently radially inwardly spaced from the tire bead after ply turn-up to permit subsequently applied plies to be turned beneath the bead.

8. A tire building machine as set forth in claim 5 further comprising means for inflating said first and second bags simultaneously, and means for deflating said second bag prior to deflation of said first bag.

9. A tire building machine as set forth in claim 5 wherein said first ring is positioned inside and near such one end of said drum, and said second ring is positioned slightly radially inwardly and axially beyond but adjacent to said first ring.

10. A tire building machine as set forth in claim 5 further comprising means for moving said first and second rings and thus said first and second inflatable bags axially toward and away from such one end of said drum.

11. A tire building machine as set forth in claim 10 further comprising means for inflating said bags simultaneously to cause said second bag to wrap said first bag around the end of said drum as aforesaid.

References Cited

UNITED STATES PATENTS

| | | | |
|---|---|---|---|
| 2,409,974 | 10/1946 | Breth | 156—132 |
| 3,044,533 | 7/1962 | Lowe | 156—401 |
| 3,078,204 | 2/1963 | Appleby | 156—132 |
| 3,127,294 | 3/1964 | Porter | 156—131 |
| 3,184,360 | 5/1965 | Nadler | 156—132 X |
| 3,305,427 | 2/1967 | Rehman | 156—132 X |

FOREIGN PATENTS

| | | |
|---|---|---|
| 232,727 | 5/1959 | Australia. |
| 691,195 | 5/1953 | Great Britain. |

EARL M. BERGERT, *Primary Examiner.*

C. B. COSBY, *Assistant Examiner.*

U.S. Cl. X.R.

156—132